(12) United States Patent
Hagiwara

(10) Patent No.: US 8,581,989 B2
(45) Date of Patent: Nov. 12, 2013

(54) EXTERNAL STORAGE DEVICE AND CAMERA

(75) Inventor: Kosuke Hagiwara, Tokyo (JP)

(73) Assignee: Nikon Corporation, Tokyo (JP)

( * ) Notice: Subject to any disclaimer, the term of this patent is extended or adjusted under 35 U.S.C. 154(b) by 856 days.

(21) Appl. No.: 12/309,835

(22) PCT Filed: Aug. 2, 2007

(86) PCT No.: PCT/JP2007/065185
§ 371 (c)(1),
(2), (4) Date: Jan. 30, 2009

(87) PCT Pub. No.: WO2008/016113
PCT Pub. Date: Feb. 7, 2008

(65) Prior Publication Data
US 2010/0002098 A1  Jan. 7, 2010

(30) Foreign Application Priority Data
Aug. 4, 2006  (JP) .................................. 2006-213407

(51) Int. Cl.
*H04N 5/225* (2006.01)
*H04N 5/76* (2006.01)

(52) U.S. Cl.
USPC .................................. 348/207.1; 348/231.99

(58) Field of Classification Search
None
See application file for complete search history.

(56) References Cited

U.S. PATENT DOCUMENTS

| 5,796,428 | A * | 8/1998 | Matsumoto et al. ..... 348/207.99 |
|---|---|---|---|
| 6,834,130 | B1 * | 12/2004 | Niikawa et al. ............... 382/305 |
| 7,030,914 | B2 * | 4/2006 | Yamagami .................. 348/231.2 |
| 7,158,175 | B2 * | 1/2007 | Belz et al. ................... 348/231.3 |
| 7,167,206 | B2 * | 1/2007 | Kayanuma .................... 348/375 |
| 7,605,849 | B1 * | 10/2009 | Hatanaka ..................... 348/231.2 |
| 2002/0067923 | A1 * | 6/2002 | Fujimura ....................... 396/429 |
| 2002/0191079 | A1 * | 12/2002 | Kobayashi et al. .......... 348/207.1 |
| 2004/0021669 | A1 * | 2/2004 | Fredlund et al. ............... 345/530 |
| 2004/0179103 | A1 * | 9/2004 | Endo et al. ................... 348/207.2 |
| 2005/0165795 | A1 * | 7/2005 | Myka et al. .................... 707/100 |
| 2005/0195283 | A1 * | 9/2005 | Sakuda et al. ........... 348/207.99 |
| 2006/0142059 | A1 | 6/2006 | Ishiguro et al. |

FOREIGN PATENT DOCUMENTS

| JP | A-9-284696 | 10/1997 |
|---|---|---|
| JP | A-2001-69296 | 3/2001 |
| JP | A-2001-309219 | 11/2001 |
| JP | A-2002-209175 | 7/2002 |
| JP | A-2003-250124 | 9/2003 |
| JP | A-2004-94914 | 3/2004 |

(Continued)

OTHER PUBLICATIONS

May 15, 2012 Office Action issued in Japanese Application No. 2008-527791 (with translation).

*Primary Examiner* — Sinh Tran
*Assistant Examiner* — Jason Flohre
(74) *Attorney, Agent, or Firm* — Oliff & Berridge, PLC

(57) ABSTRACT

An external storage device includes: a read out unit that reads out management information in a camera, regarding an image file that is stored within the camera; an identification unit that identifies information on specifying device to which the image file was transmitted, based upon the management information read out by the read out unit; a selection unit that selects an image file to be received from the camera, on the basis of a result of identification by the identification unit; and a reception unit that receives the selected image file.

10 Claims, 10 Drawing Sheets

(56) References Cited

FOREIGN PATENT DOCUMENTS

| JP | A-2004-336196 | 11/2004 |
| JP | A-2005-122303 | 5/2005 |
| JP | A-2005-258613 | 9/2005 |
| JP | A-2005-309219 | 11/2005 |
| JP | A-2006-157517 | 6/2006 |
| JP | A-2007-148930 | 6/2007 |

* cited by examiner

FIG.3

(a)
```
CAMERA (SERIAL #:stuv)
THUMBNAILS
    ABCDstuv0001s.jpg
        ⋮
    ABCDstuv2000s.jpg
    EFGHstuv0001s.jpg
        ⋮
    EFGHstuv3000s.jpg
```
CL1

(b)
```
STORAGER (SERIAL #: ABCD)
  CAMERA (SERIAL #: stuv)
    0001.jpg   ABCDstuv0001
        ⋮
    1000.jpg   ABCDstuv2000

CAMERA (SERIAL #: wxyz)
    ABCDwxyz0001s.jpg
        ⋮
    ABCDwxyz1500s.jpg
```
SL1

(c)
```
CAMERA (SERIAL #: wxyz)
THUMBNAILS
    ABCDwxyz0001s.jpg
        ⋮
    ABCDwxyz1500s.jpg
    EFGHwxyz0001s.jpg
        ⋮
    EFGHwxyz2000s.jpg
```
CL2

EXTERNAL STORAGE DEVICE AND CAMERA

TECHNICAL FIELD

The present invention relates to an external storage device that can read in and record image data stored in a camera, and to a camera that is connected to such an external storage device.

BACKGROUND ART

An external storage device is known, that can store images recorded in a camera and can back up image data. With a prior art external storage device, along with searching for new image data in the camera and transferring this image data to a hard disk and storing it therein, thumbnail images are created from the image data and stored (for example, refer to Patent Reference #1).
Patent Reference #1: Japanese Laid-Open Patent Publication 2002-209175.

DISCLOSURE OF THE INVENTION

Problems to be Solved by the Invention

However, when the image data is stored without specifying any device to receive it, as in this prior art technique, there is a fear that it will not be possible to perform storage processing upon the images in an appropriate manner for the destination device.

Means for Solving the Problems

An external storage device according to the present invention comprises: a read out unit that reads out management information in a camera, regarding an image file that is stored within the camera; an identification unit that identifies information on specifying device to which the image file was transmitted, based upon the management information read out by the read out unit; a selection unit that selects an image file to be received from the camera, on the basis of a result of identification by the identification unit; and a reception unit that receives the selected image file.

It is preferred that this external storage device further comprises: a command unit that commands the writing of the information on specifying device in a management information recording field regarding an image file in the camera, the image file in the camera being corresponding to the image file that was received by the external storage device.

A camera that is connected to an external storage device described above, further comprises: a deletion setting unit that specifies an image file that is to be deleted after transmission of the image file as an image file scheduled for deletion before the image file is transmitted to the external storage device; and a deletion unit that deletes the image file scheduled for deletion from within the camera, after the image file has been transmitted to the external storage device.

It is preferred that the deletion unit included in the camera deletes the image file scheduled for deletion, after a signal indicating that the external storage device has completed reception of the image file has been input from the external storage device. Furthermore, this camera may further comprise: a write unit that writes the information on specifying in the management information recording field regarding the image file, when the command is input from the command unit.

An external storage device according to another aspect of the present invention, comprises: an identification unit that acquires management information regarding an image file within a camera, and identifies whether the image file is a first image file to which a file name indicating that the image file has been received by the external storage device is assigned, or is a second image file to which no file name indicating that the image file has been received is assigned, based upon the management information; a reception unit that receives the second image file from the camera; a change unit that changes the file name of the second image file that has been received; and a transmission unit that transmits the second image file to the camera, the second image file being one of processed and without processing.

It is preferred that in the external storage device, the file name indicating that the image file has been received includes information on specifying device, which specifies a destination device. Furthermore, the identification unit may identify the image file of which the destination device indicated by the information on specifying device indicates a device other than the external storage device, as a second image file. It is preferred that the external storage device further comprises: a deletion command unit that commands the deletion of the second image file within the camera, after the second image file has been transmitted by the transmission unit, the second image file being one of processed and without processing.

An external storage device according to another aspect of the present invention stores an image transferred from a camera, and comprises: a setting unit that when a pair of external storage devices are connected to one another, sets one of these external storage devices as a host and the other one of these external storage devices as a peripheral. It is preferred that an external storage device comprises: a list read unit that reads in a list regarding image files stored by the external storage device that is set by the setting unit as a peripheral; and a reception unit that receives differential image file, on the basis of the list regarding the image files that has been read in, and a list regarding image files stored by the external storage device set as a host.

An external storage device according to another aspect of the present invention stores image files transferred from a camera upon a storing device, and comprises: a device identification unit that identifies whether an external device that has been connected is a camera, or is another external storage device; and a transfer execution unit that executes processing for performing image file transfer with the camera, if the external device that has been connected is a camera; and executes processing for performing image file transfer with the other external storage device, if the external device that has been connected is another external storage device.

It is preferred that the external storage device may further comprise: a decision unit that decides whether or not the camera that has been connected is capable of transferring image file by first transfer processing, and in this external storage device the transfer execution unit receives image file from the camera by the first transfer processing if transferring image file by the first transfer processing is decided to be possible, and receives image file from the camera by second transfer processing that is different from the first transfer processing if transferring image file by the first transfer processing is decided to be impossible. It is preferred that in the first transfer processing, image file is received from the camera on the basis of management information regarding image file stored within the camera; and in the second transfer processing, image file is received from the camera on the basis of file name of image file stored within the camera. Furthermore, the transfer execution unit may receive image file that is differential, on the basis of a list regarding image file read in from the other external storage device and on the basis of a list regarding image file stored in the storing device.

Advantageous Effect Of The Invention

According to the present invention, it is possible to perform reception processing upon the image file, in an appropriate manner for the destination device.

BRIEF DESCRIPTION OF THE DRAWINGS

FIG. 3 is a figure showing correspondence relationships between image file names and management numbers: FIG. 3 (a) is an example of an image file list that shows a list of image files recorded upon an electronic camera; FIG. 3 (b) is an example of a storage file list that shows a list of image files recorded upon a storage; and FIG. 3 (c) is another example of an image file list that shows a list of image files recorded upon an electronic camera;

BEST MODE FOR CARRYING OUT THE INVENTION

Figure 1:
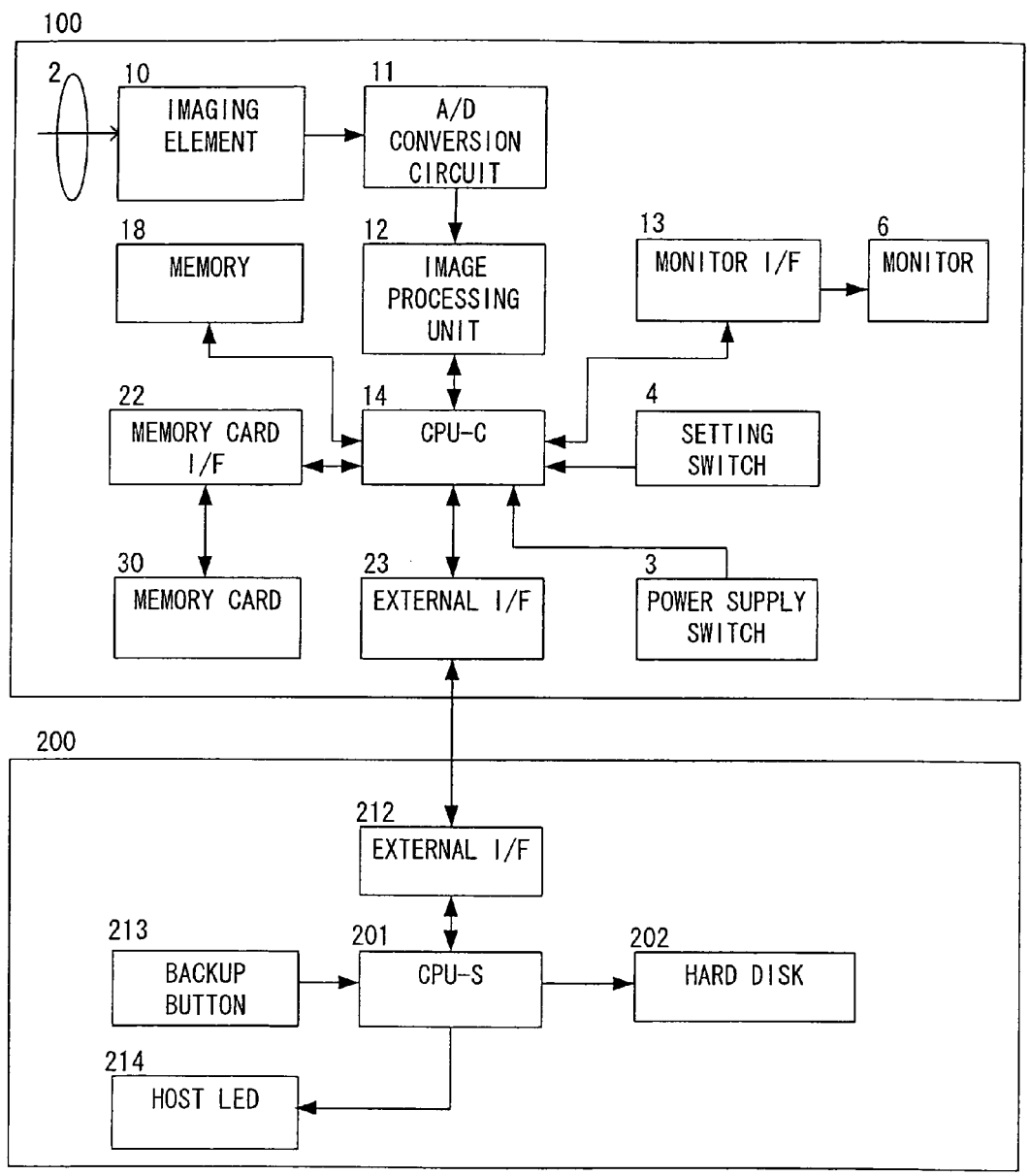
FIG. 1 is a block diagram for explanation of the main structure of an external storage device and a camera, in an embodiment of the present invention.

Embodiments of the external storage device and the camera according to the present invention will now be explained with reference to the drawings. FIG. 1 is a block diagram of this electronic camera 100 and this storager 200. The electronic camera 100 includes a photographic lens 2, a power supply switch 3, a setting switch 4, a liquid crystal monitor 6, an imaging element 10, an A/D conversion circuit 11, an image processing unit 12, a monitor interface 13, a CPU-C 14, a memory 18, a memory card interface 22, and an external interface 23.

When the power supply switch 3 is actuated, the system goes into the photography mode, and the incident light from the photographic subject that passes through the photographic lens 2 is conducted to the imaging element 10, and forms an image of the photographic subject upon this photographic image surface. The imaging element 10 is a CCD or a CMOS imaging element that includes a plurality of photoelectric conversion elements that correspond to pixels. The imaging element 10 captures this image of the photographic subject that is imaged upon its photographic image surface, and outputs a color photoelectric conversion signal that corresponds to the brightness of the photographic subject image. After analog processing has been performed upon this image capture signal by an AFE circuit or the like not shown in the figures, the A/D conversion circuit 11 converts it into a digital signal.

The image processing unit 12 consists of, for example, an ASIC, and performs image processing such as white balance adjustment, saturation correction, tone correction and so on upon the image signal captured from the imaging element 10. The CPU-C 14 inputs the signals outputted from various blocks and performs predetermined calculations thereupon, and outputs control signals to various blocks on the basis of the results of these calculations. The memory 18 is a working memory for the CPU-C 14. This memory 18 consists of a SDRAM. The CPU-C 14 performs compression processing upon the image data input from the image processing unit 12 by a predetermined method such as JPEG or the like, and records it upon a memory card 30 in EXIF format or the like.

Next, the procedure for displaying an image upon the liquid crystal monitor 6 will be explained.

First, the CPU-C 14 creates image data for display, for displaying an image upon the liquid crystal monitor 6. In concrete terms, the CPU-C 14 reads out an image file that is recorded upon the memory card 30 via the memory card interface 22, and creates image data matched to the size of the display on the liquid crystal monitor 6. Since, in this embodiment, the size of the display upon the liquid crystal monitor 6 is VGA size (640×480 pixels), the CPU-C 14 creates image data for display of VGA size. And the CPU-C 14 writes this created image data for display into the memory 18. Moreover, via the monitor interface 13, the CPU-C 14 displays an image that corresponds to this image data for display upon the liquid crystal monitor 6.

Furthermore, according to the actuation of a setting switch 4, menu screens for performing setting processing for various modes of the electronic camera 100 are displayed upon the liquid crystal monitor 6. By the user actuating the setting switch 4 while checking these setting screens, he may make settings of various types. As one of these settings, there is a setting for whether or not an image file upon the memory card 30 is to be deleted, when that image file is transferred to the storager 200.

The memory card interface 22 is an interface for performing data communication with the memory card 30. And the external interface 23 is an interface for performing data communication with an external device such as the storager 200 or the like, via a predetermined cable or via a wireless transmission path.

The memory card 30 may be, for example, a card type removable memory that utilizes a semiconductor memory, and image data after image processing is stored on this memory card 30. It should be understood that it would also be acceptable to store RAW date thereupon. The memory card 30 can be fitted to and detached from the electronic camera 100. When this memory card 30 is installed to the electronic camera 100, then, as described above, it is possible to transmit and receive image data to and from the electronic camera 100 via the memory card interface 22 of the electronic camera. In other words, the memory card 30 functions as a storage medium for the electronic camera 100, when it is installed to the electronic camera 100.

The storager 200 is an external storage device that stores image data consisting of images of photographic subjects captured by the electronic camera 100. This storager 200 includes a CPU-S 201, a hard disk 202, an external interface 212, a backup button 213, and a host LED 214. The CPU-S 201 inputs signals output from various blocks and performs predetermined calculations thereupon, and outputs control signals to various blocks on the basis of the results of the calculations. The hard disk 202 stores image data downloaded from the electronic camera 100. The external interface 212 performs data communication with external devices such as the electronic camera 100 and so on, via a predetermined cable or a wireless transmission path.

The backup button 213 is an actuation button for commanding the storager 200 to function as a host, according to actuation by the user, when a plurality of these storagers 200 are connected together. And the host LED 214 lights up, or blinks, according to actuation of the backup button 213. When the host LED 214 is steadily illuminated, this means that this storager 200 is functioning as a host. When the host LED 214 is blinking, this means that this storager 200 is not set to be a host. It should be understood that, when blinking, the host LED 214 goes off when a predetermined time period elapses.

Figure 2:
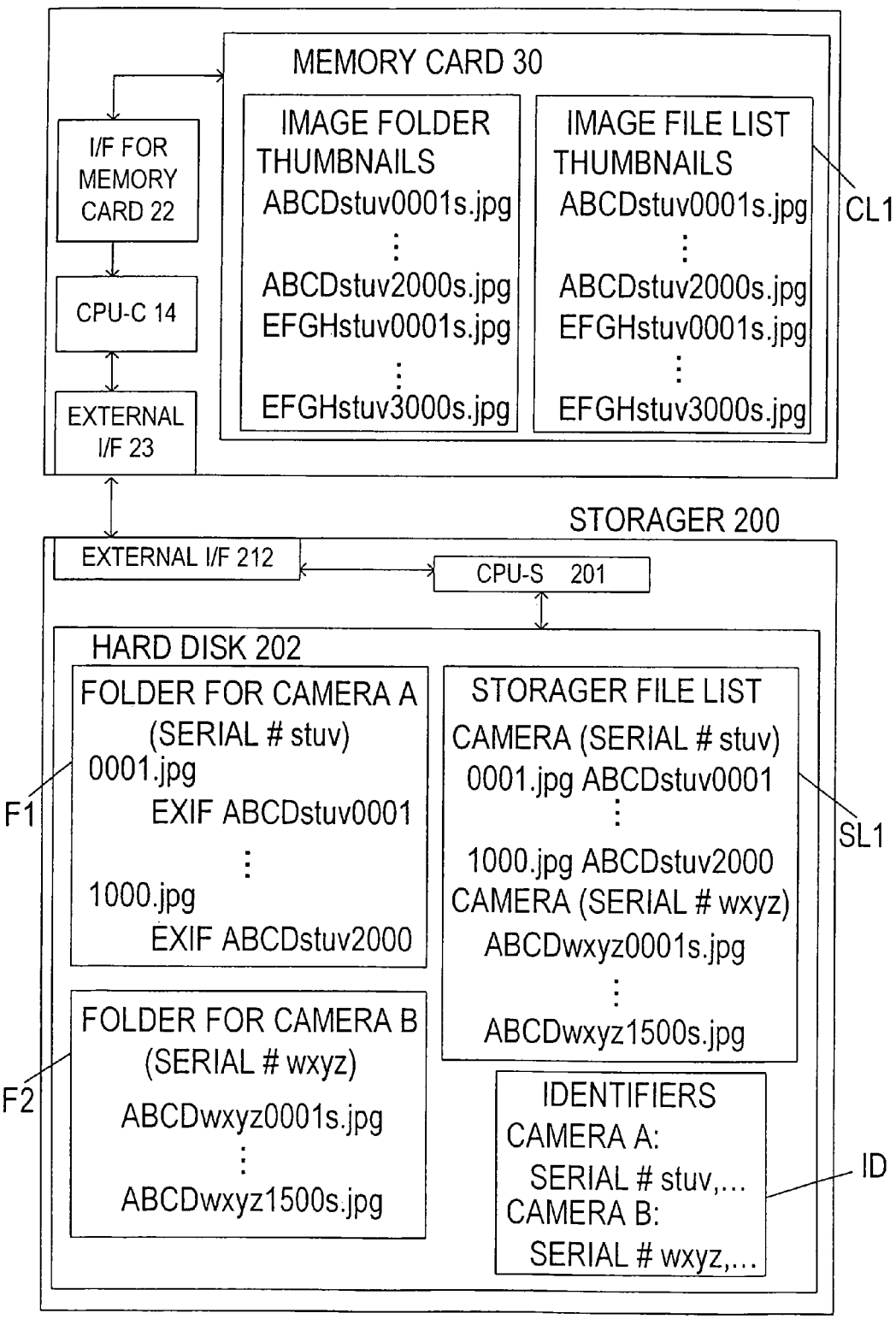
FIG. 2 is a figure for explanation of storage locations of image folders, file lists, and soon in this external storage device and camera.

Next, the processing by the storager 200 for downloading image files from the electronic camera 100 will be explained with reference to FIG. 2.

When the external interface 212 of the storager 200 and the external interface 23 of the electronic camera 100 are connected together, for example via a USB cable or the like, transmission and reception of data between them is started. When this transmission and reception of data is started, the CPU-S 201 requests the CPU-C 14 to transmit information that specifies whether or not the electronic camera 100 is a storager-compatible camera, and its identifier. Such information as to whether or not the camera is a storager-compatible camera may be, for example, a camera type code or the like. In this identifier, there is included information such as the name of the maker of the electronic camera 100, the name of its device type, its serial number, and so on. This identifier is stored in the CPU-C 14.

Upon receipt of this identifier, the CPU-S 201 decides whether or not this electronic camera 100 is a storager-compatible camera. Next, the CPU-S 201 refers to the identifiers registered upon the hard disk 202, shown in FIG. 2, and determines whether or not the identifier that has been received is already registered upon the hard disk 202. If this identifier is not registered, in other words if this is the first time that this electronic camera 100 has been connected to this storager 200, the CPU-S 201 creates a device-unique folder upon the hard disk 202 for this electronic camera 100. Thus, in the storager 200 of FIG. 2, a folder F1 for a camera A and a folder F2 for a camera B have been created. Moreover, the CPU-S 201 registers the identifier of this camera upon the hard disk 202. In the storager 200 of FIG. 2, the identifier "stuv" of the camera A and the identifier "wxyz" of the camera B are registered in an identifier list ID. Subsequently, image files that are downloaded from this electronic camera 100 will be recorded in this individual folder. If the identifier is already registered, in other words if this electronic camera 100 and this storager 200 have been connected together in the past, the above described individual folder will already be present upon the hard disk 202. Thus, the CPU-S 202 sets this folder as a recording destination for downloading and recording image files upon the memory card 30.

When this individual unique folder has been created upon the hard disk 202, the CPU-S 201 requests the electronic camera 100 to transmit an image file list CL1. This image file list CL1 is a list of the images that are recorded upon the memory card 30 of the electronic camera 100. As shown in FIG. 2, this image file list CL1 is stored upon the memory card 30. Upon receipt of this image file list CL1 from the electronic camera 100, the CPU-S 201 downloads the image files that are recorded upon the memory card 30. At this time, if this electronic camera 100 is a camera that is compatible with the storager 200 (i.e. if it is a compatible camera), the image files that are to be downloaded are selected on the basis of the EXIF information in the image files. If this electronic camera is not compatible with the storager 200 (i.e. if it is a non-compatible camera), the image files that are to be downloaded are selected on the basis of the file names of the image files. The procedure by that the CPU-S 201 selects the image files to be downloaded will be described in detail herein after.

When the image files that have been downloaded are recorded in the individual folder for this camera, information for these image files that have been downloaded is added by the CPU-S 201 to a storager file list SL1. As shown in FIG. 2, this storager file list SL1 is a list in which the EXIF information and the file names of all the image files recorded upon the hard disk 202 are listed. The storager file list SL1 is stored upon the hard disk 202.

The EXIF information is various kinds of information appended to the image files, recorded in conformity with the EXIF standard. In this EXIF information, there may be included a region in which the date and time of photography are recorded, a region in which various types of photographic condition are recorded, a free region that may be used by each vendor as desired, and so on. In this embodiment, as will be described herein after, a management number specifying that the image file has been transmitted is recorded in this free region.

—A storager-compatible camera—

The case in which the storager 200 is connected to an electronic camera 100 that is compatible with this storager 200 will now be explained.

A management number is added into the EXIF tag in an image file downloaded from a storager-compatible camera by the CPU-S 201. This image file for which a management number has been added into its EXIF tag is recorded by the CPU-S 201 in a device-unique folder upon the hard disk 202. The management number contains the serial number of the storager 200, the serial number of the electronic camera 100 that was connected to the storager 200, and the sequence of downloading, in other words a number in sequence attached according to the order of recording upon theharddisk202. If, for example, the serial number of the storager 200 is "ABCD" and the serial number of the electronic camera 100 is "stuv", the management number for the first image file that is recorded upon the individual folder on the hard disk 202 becomes "ABCDstuv0001". In other words, from this management number, it is possible to distinguish upon which electronic camera 100 this image file was created, which storager 200 it was downloaded to, and which numbered file in the sequence recorded upon the hard disk 202 it was.

The management number described above is also attached to a thumbnail image that is a shrunken down version of the downloaded image. In other words, the CPU-S 201 creates a thumbnail image file on the basis of the downloaded image file, and sets the its thumbnail file name to "ABCDstuv0001s.jpg". When this setting of the thumbnail file name is completed, the CPU-S 201 transmits the thumbnail file and the management number to the electronic camera 100 via the external interfaces 212 and 23. When this transmission of the thumbnail file and the management number has been completed, the CPU-S 201 transmits a download completed command to the electronic camera 100.

Upon receipt of the download completed command from the storager 20o, the CPU-C14 of the electronic camera 100 performs processing as follows, according to whether a setting for deleting image files after image transfer (i.e. a file deletion setting) is ON or OFF. If the delete setting is ON, the CPU-C 14 deletes from the memory card 30 the same image file as the image file that was transferred to the storager 200. Moreover, the CPU-C 14 records the thumbnail image file that has been received from the storager 200 upon the memory card 30. On the other hand, if the delete setting is OFF, in other words if the setting is not to delete an image file even after image transfer, the CPU-C 14 attaches the management number that was inputted from the CPU-S 201 of the storager 200 to the EXIF tag of the same image file as the image file that was transferred to the storager 200. Moreover, the CPU-C14 records the thumbnail image file that has been received from the CPU-S 201 upon the memory card 30.

As described above, when an image file is transferred from the electronic camera 100 to the storager 200, the memory card 30 of the electronic camera 100 and the hard disk 202 of the storager 200 have the same image files that have the same management number. When the CPU-S 201 of the storager 200 selects an image file downloaded from the electronic camera 100, it refers to this management number.

Using FIGS. 3(a) and 3(b), the above described file transfer program for a storager-compatible camera will now be explained in concrete terms. Before downloading any image files, the CPU-S 201 of the storager 200 receives the image file list CL1 from the CPU-C 14 of the electronic camera 100, as described above. An example of an image file list CL1 that has been received from an electronic camera 100 whose serial number is "stuv" is shown in FIG. 3(a). The CPU-S 201 requests the CPU-C 14 of the electronic camera 100 to transmit the EXIF information of some one of the image files in this image file list CL1. Then the CPU-S 201 determines whether or not the serial number "ABCD" that is assigned to this storager 200 is included in the EXIF information that is received. And the CPU-S 201 distinguishes and selects those image files to which a management number "EFGH" that does not agree with the management number "ABCD" in the storage file list SL1 shown in FIG. 3(b) is appended as image files that have not yet been downloaded. Then the CPU-S 201 downloads the image files that have been selected by the above procedure from the electronic camera 100, and records them within an individual folder upon the hard disk 202, in other words in a folder for the electronic camera 100 that has the serial number "stuv". The CPU-S 201 repeats similar processing in relation to all of the image files in the image file list, thus downloading those image files that are not recorded in the individual folder upon the hard disk 202, in other words the image files "EFGHstuv0001" through "EFGHstuv3000" from among the image files of FIG. 3(a), and records them in the individual folder for the camera that is currently connected and that has the serial number "stuv".

—A Non-Storager-Compatible Camera—

The case in which the storager 200 is connected to an electronic camera 100 that is not compatible with this storager 200 will now be explained The file name of an image file that has been downloaded from a non-storager-compatible camera is overwritten with a management number by the CPU-S 201, and is recorded in a device-unique folder for this camera upon the hard disk 202. If the serial number of this electronic camera 100 is, for example, "wxyz", the management number is represented as "ABCDwxyz0001" in a similar manner to the case with a compatible camera. In other words, the file name that is overwritten with the management number shows that this image has been received by the storager 200. Moreover, a management number is also appended by the CPU-S 201 to the thumbnail image file that is a shrunken down version of the image that has been downloaded in a similar manner to the case with a compatible camera. In other words, the CPU-S 201 creates a thumbnail image file on the basis of the image file that has been downloaded, and sets its thumbnail file name to "ABCDwxyz0001s.jpg". When this setting of the thumbnail file name has been completed, the CPU-S 201 transmits this thumbnail image file to the electronic camera 100 via the external interfaces 212 and 23. When the transmission of the thumbnail image file has been completed, the CPU-S 201 transmits a download completed command. Moreover, the CPU-S 201 transmits a signal (herein after termed a "deletion command") that commands the deletion of the image file that was transferred to the storager 200, the image file being recorded upon the memory card 30.

Upon receipt of the download completed command from the CPU-S 201 of the storager 200, the CPU-C 14 of the electronic camera 100 records the thumbnail image file that has been received from the storager 200 upon the memory card 30. Furthermore, upon receipt of the deletion command for the image file, the CPU-C 14 deletes the image file that was downloaded to the storager 200, and that is an image file recorded upon the memory card 30.

As described above, when image files are downloaded to the storager 200 from the electronic camera 100, both the memory card 30 of the electronic camera 100 and the individual folder on the hard disk 202 of the storager 200 have the same image files as one another, with the same file names. When selecting an image file downloaded from the electronic camera 100, the CPU-S 201 of the storager 200 refers to these image file names, in other words management numbers.

Using FIGS. 3(b) and 3(c), the above described file transfer program for a non-storager-compatible camera will now be explained in concrete terms. Before downloading any image files, the CPU-S 201 of the storager 200 receives the image file list CL2 from the CPU-C 14 of the electronic camera 100, as described above. An example of an image file list CL2 that has been received from an electronic camera 100 whose serial number is "wxyz" is shown in FIG. 3(c). The CPU-S 201 determines and selects any one of image files with a file name that does not agree with the image files "ABCDstuvOO1[1]" through "ABCDstuv2000" and "ABCDwxyz0001" through "ABCDwxyz1500" in the storager file list SL1 shown in FIG. 3(b) as image file that has not yet been downloaded. When this selection of the image file to be downloaded is completed, the CPU-S 201 requests the CPU-C 14 to transmit the image file that has been selected. When the image file that has been requested is received from the electronic camera 100, the CPU-S 201 records the image file in an individual folder upon the hard disk 202, in other words in a folder that is individual to this electronic camera 100 having the identifier "wxyz". The CPU-S201 repeats similar processing in relation to all of the image files in the image file list CL2, thus downloading the image files that are not recorded upon the hard disk 202, in other words "EFGHwxyz0001" through "EFGHwxyz2000", from among the image files listed in the image file list CL2 of FIG. 3(c), and records them in the individual folder for the camera that is currently connected and that has the serial number "wxyz".

—Connecting Storagers Together—

Figure 4:
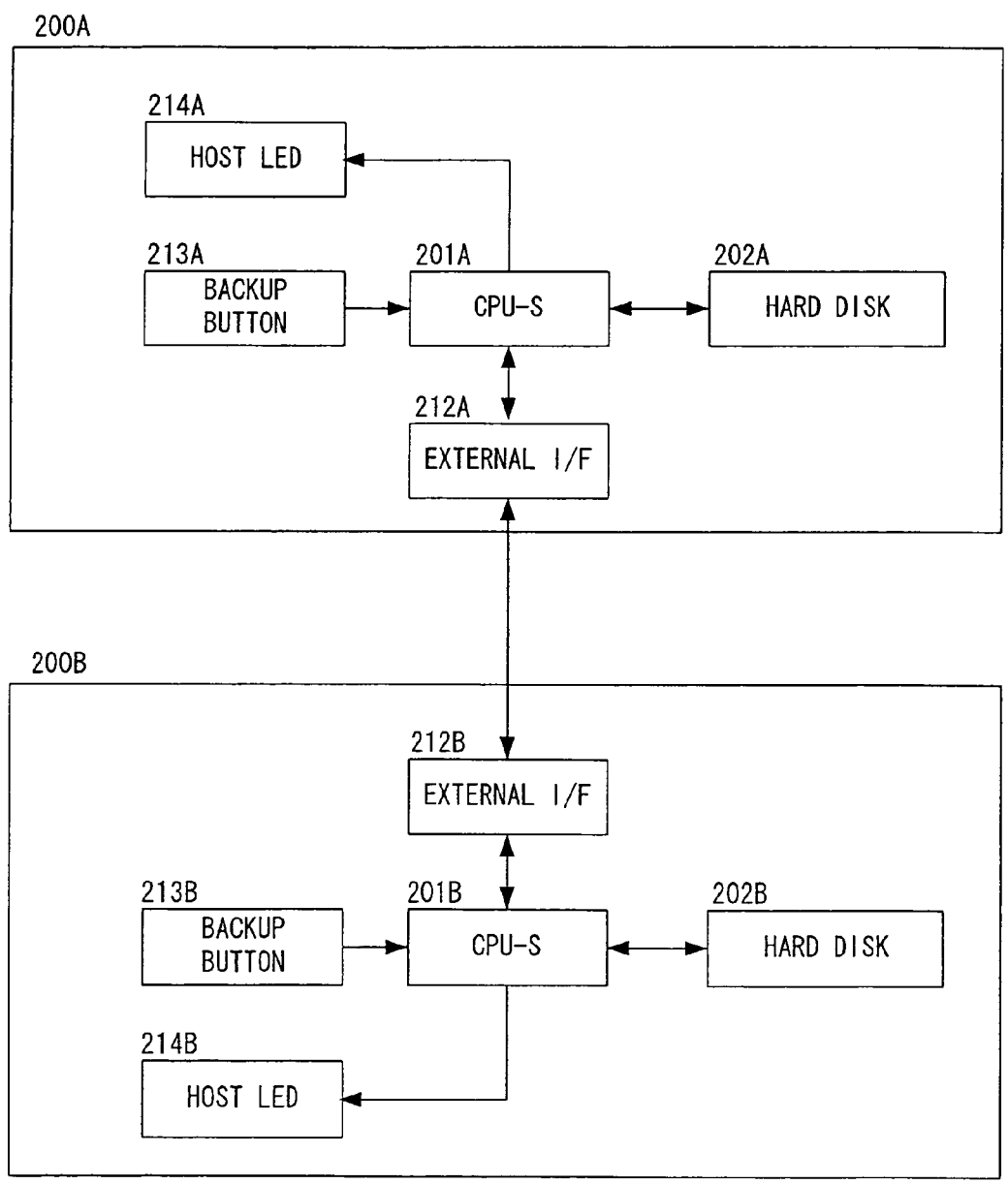
FIG. 4 is a block diagram for explanation of the main structure of the external storage device of this embodiment.

While the case of connecting a storager 200 to an electronic camera 100 have been explained above, the case of connecting together two storagers 200A and 200B will now be explained with reference to FIG. 4. It should be understood that, in this explanation, the letters "A" and "B" will be appended to the various structural elements of these storagers 200A and 200B. When the storagers 200A and 200B are connected together, it is possible to download image files that are recorded upon the hard disk 202B of one of the storager 200B on the peripheral side to the hard disk 202A of the other of the storager 200A upon the host side. In other words, the storager 200A functions as a backup device for the storager 200B.

The storager 200A and the storager 200B are connected together via their external interfaces 212A and 212B, for example by a USB cable or the like. In this case, when the backup button 213A on the storager 200A is actuated to ON, then the storager 200A is set as a host and the storager 200B is set as a peripheral (i.e. as a peripheral device) on the basis of the USB OTG (On-The-Go) standard. When the storager 200A is set as a host, its host LED 214A is illuminated by a signal from its CPU-S 201A.

The USBOTG standard is a standard that makes it possible to connect together, not via a personal computer, two peripheral devices that may for example be a portable telephone terminal, a digital camera, a printer, a game machine, or the like. With this USB OTG standard, it is possible to alternate service as the host and service as the peripheral between the connected devices, according to a host exchange protocol (HNP: Host Negotiation Protocol).

The CPU-S 201A of the storager 200A that has become the host requests the CPU-S 201B of the storager 200B to transmit a storager file list, via the external interfaces 212A and 212B. The CPU-S 201A compares together the storager file list that has been received from the CPU-S 201B and the storager file list upon its own hard disk 202A, on the basis of their management numbers. These management numbers, as described above, include the serial number of an external storage device, the serial number of a camera, and a number that specifies the order for download to an external storage device. During the comparison, the CPU-S 201A obtains the differential between all of the management numbers of the storager 200B that have been received, and all of the management numbers within the storager file list of the storager 200A. By taking this differential between the management numbers in these storager file lists, the CPU-S 201A is able to extract those image files that have different management numbers from the management numbers in the storager file list of the storager 200A as differential image files.

When these differential image files have been extracted, the CPU-S 201A selects a single image file from these differential image files. When this image file has been selected, the CPU-S 201A transmits a signal to the CPU-S 201B that requests it to download the selected image file. Upon receipt of the image file that has been requested, the CPU-S 201A records this image file upon the hard disk 202A. The CPU-S 201A executes the processing described above for all of the differential image files, and thereby performs downloading of all of the differential image files. When this downloading of all of the differential image files has been completed, the CPU-S 201A transmits to the CPU-S 201B of the storager 200B a completion notification signal that indicates that the downloading has been completed.

Figure 5:
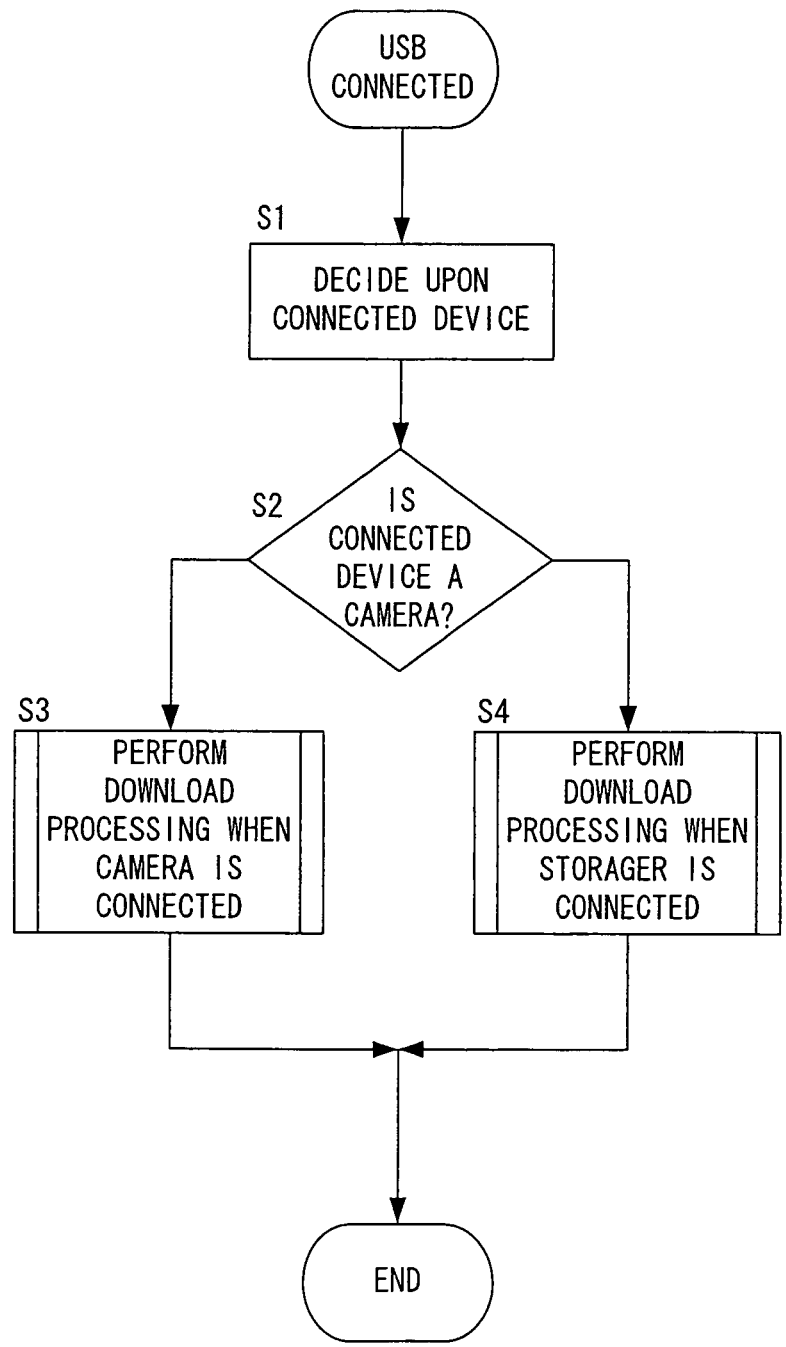
FIG. 5 is a flow chart for explanation of certain processing steps, in the downloading operation of the external storage device of this embodiment.
Figure 6:
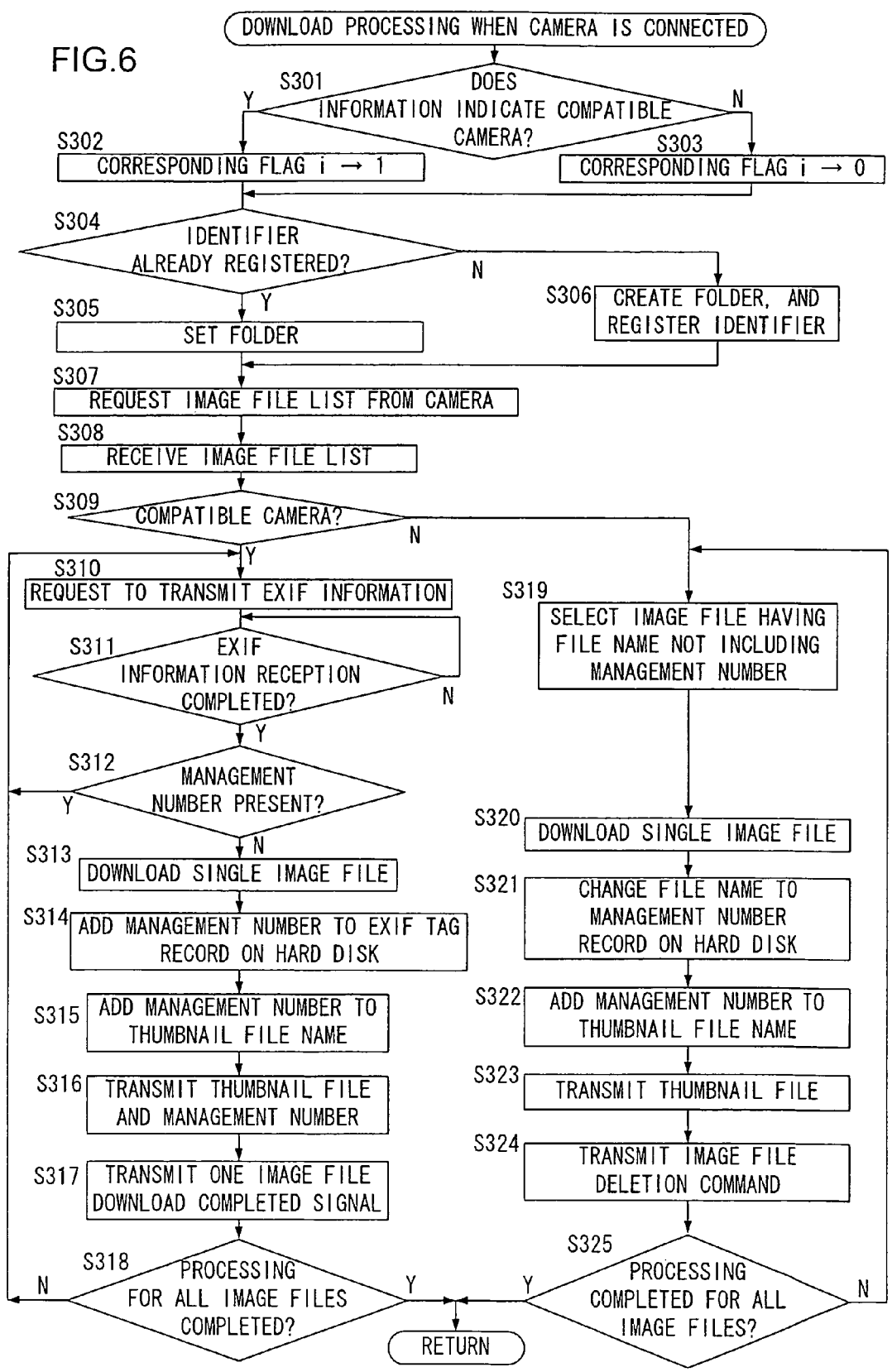
FIG. 6 is a flow chart for explanation of certain processing steps during the downloading operation, when a camera is connected to this external storage device.
Figure 9:
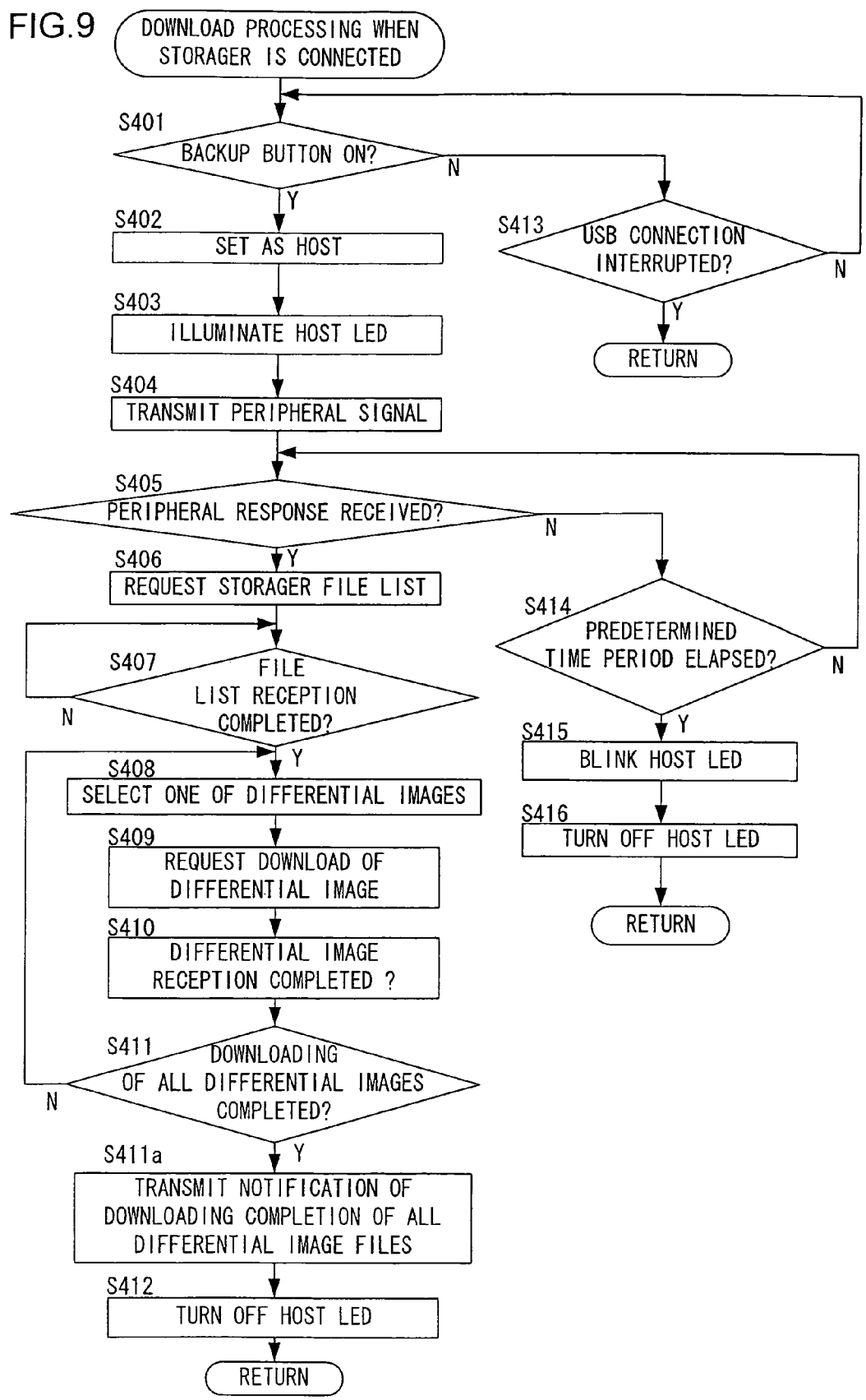
FIG. 9 is a flow chart for explanation of certain processing steps during a downloading operation, when two external storage devices have been connected together.

Next, the download processing for an image file by the storager 200 described above will be explained using the flow charts shown in FIGS. 5, 6, and 9. The programs that perform the processing shown in FIGS. 5, 6, and 9 are stored in a memory within the CPU-S 201, not shown in the figures. These programs are started and are executed by the CPU-S 201, when a signal indicating that an external device has been connected is input by the external interface 212. The steps of FIG. 5, FIG. 6, and FIG. 9 are processing on the basis of commands by the CPU-S 201.

In a step S1 of FIG. 5, a decision is made as to the device that has been connected to the external interface 212, and then the flow of control proceeds to a step S2. In this step S1, an identifier that is intrinsic to the device is inputted and recognized. In the step S2, a decision is made as to whether or not the device that has been connected is an electronic camera 100. If it is an electronic camera 100 that has been connected, an affirmative decision is made in this step S2, and the flow of control proceeds to a step S3. If it is a storage 200 that has been connected, a negative decision is made in this step S2, and the flow of control proceeds to a step S4.

In the step S3, a subroutine shown in FIG. 6 for when a camera is connected is called. After the various processing steps in this subroutine, this processing sequence terminates. In the step S4, a subroutine shown in FIG. 9 for when a storager is connected is called. After the various processing steps in this subroutine, this processing sequence terminates.

In the following, the subroutine of this step S3 of FIG. 5 that is called when a camera connection is established will be explained using the flow chart shown in FIG. 6.

In a step S301, a decision is made as to whether or not information has been inputted that specifies that the electronic camera 100 that has been connected is a compatible camera. If a compatible camera has been connected an affirmative decision is made in this step S301, and the flow of control proceeds to a step S302. If a non-compatible camera has been connected, a negative decision is made in this step S301 and the flow of control proceeds to a step S303. It should be understood that whether this is a compatible camera or not may be distinguished from the device type code of the camera, or the like.

In the step S302, a corresponding flag i is set to "i=1", and then the flow of control is transferred to a step S304. And, in the step S303, the corresponding flag i is set to "i=0", and then the flow of control proceeds to the step S304.

In the step S304, a decision is made as to whether or not the identifier of the electronic camera 100 that was recognized in the step S1 is already registered upon the hard disk 202. If the identifier is already registered an affirmative decision is made in this step S304 and the flow of control proceeds to a step S305. If the identifier is not already registered a negative decision is made in this step S304 and the flow of control is transferred to a step S306.

If the flow of control reaches the step S305, a folder that is individual to this electronic camera 100 has already been created upon the hard disk 202. Thus, this individual camera folder is set as the recording destination for recording the image files, and then the flow of control proceeds to a step S307. If the flow of control reaches the step S306, no such folder individual to this camera has yet been created. Thus, along with creating an intrinsic folder for this camera upon the hard disk 202, the camera identifier is also registered upon the hard disk 202, and then the flow of control proceeds to the step S307.

In the step S307, a signal is outputted that requests the CPU-C 14 to transmit a list of the image files that are recorded upon the memory card 30 of the electronic camera 100, in other words an image file list, and the flow of control proceeds to a step S308. In this step S308, the image file list is received from the CPU-C 14, and then the flow of control proceeds to a step S309.

In the step S309, a decision is made as to whether or not the electronic camera 100 is a compatible camera. If it is a compatible camera, in other words if the corresponding flag i is 1, an affirmative decision is made in this step S309 and the flow of control proceeds to a step S310. If the electronic camera 100 is a non-compatible camera, in other words if the corresponding flag i is 0, a negative decision is made in this step S309 and the flow of control is transferred to a step S319.

In the step S310, any one of image files is selected from the image file list that was received in the step S308 and a signal is output that requests the CPU-C 14 to transmit its EXIF information, and then the flow of control proceeds to a step S311. In the step S311, a decision is made as to whether or not the EXIF information that was requested in the step S310 has been received. If the EXIF information has been received, an affirmative decision is made in this step S311 and the flow of control proceeds to a step S312. If the EXIF information has not been received, a negative decision is made in this step S311 and the system waits at this step S311 until the EXIF information is received.

In the step S312, a decision is made as to whether or not the management number (for example "ABCD") of the storager 200 itself that is executing this processing is appended to the EXIF information that has been received. If the management number of the storager 200 itself that is executing this processing is appended, an affirmative decision is made in this step S312 and the flow of control returns to the step S310. If the management number of the storager 200 itself that is executing this processing is not appended, a negative decision is made in this step S312 and the flow of control proceeds to a step S313. In this step S313, a signal that requests the CPU-C 14 to download the image file is transmitted, and then the image file is downloaded from the electronic camera 100. The flow of control proceeds to a step S314.

In the step S314, a management number is added to the EXIF tag of the image file that has been downloaded, and then the image file that has been downloaded is recorded in the individual camera folder upon the hard disk 202, and the flow of control proceeds to a step S315. In this step S315, a thumbnail image file is created on the basis of the image file that was downloaded and the thumbnail file name is rewritten using the management number, and then the flow of control proceeds to a step S316.

In this step S316, the management number that was set in the step S314 and the thumbnail image file that was created in the step S315 are transmitted to the CPU-C 14 of the electronic camera 100, and then the flow of control proceeds to a step S317. In this step S317, a signal indicating that the downloading of a single image file has been completed is transmitted to the CPU-C 14, and then the flow of control proceeds to a step S318. In this step S318, a decision is made as to whether or not the processing of the above described steps S310 through S317 has been completed for all of the image files upon the image file list that was received in the step S308. If the processing has been completed for all of the image files, an affirmative decision is made in this step S318 and the flow of control leaves this subroutine for when the camera is connected and returns to the original calling source. If some image files exist for which the processing has not yet been completed, a negative decision is made in this step S318 and the flow of control returns to the step S310.

On the other hand, if the electronic camera is a non-compatible camera, a negative decision is made in the step S309 and the flow of control is transferred to a step S319. In this step S319, one image file that has a file name that does not include the management number of this storager 200 itself executing this processing is selected from the image file list received in the step S308, and then the flow of control proceeds to a step S320. In this step S320, a signal requesting the CPU-C 14 to download the image file that was selected in the step S319 is transmitted, and the image file is downloaded from the electronic camera 100 and then the flow of control proceeds to a step S321.

In this step S321, the file name of the image file that was downloaded from the electronic camera 100 is changed to the management number, and then it is recorded in the individual camera folder upon the hard disk 202, and the flow of control proceeds to a step S322. In this step S322, a thumbnail image file is created on the basis of the image file that was downloaded, the thumbnail file name is rewritten using the management number, and then the flow of control proceeds to a step S323. In this step S323, the thumbnail image file that was created in the step S322 is transmitted to the CPU-C 14 of the electronic camera 100, and then the flow of control proceeds to a step S324.

In this step S324, a deletion command that commands the deletion of the image file recorded upon the memory card 30 of the electronic camera 100 is transmitted, and then the flow of control proceeds to a step S325. In this step S325, in a similar manner to the step S318, a decision is made as to whether or not the processing of the above described steps S319 through S324 has been completed for all of the image files upon the image file list that was received in the step S308. If the processing has been completed for all of the image files, an affirmative decision is made in this step S325 and the flow of control leaves this subroutine for when the camera is connected and returns to the original calling source. If some image files exist for which the processing has not yet been completed, a negative decision is made in this step S325 and the flow of control returns to the step S319.

Figure 7:
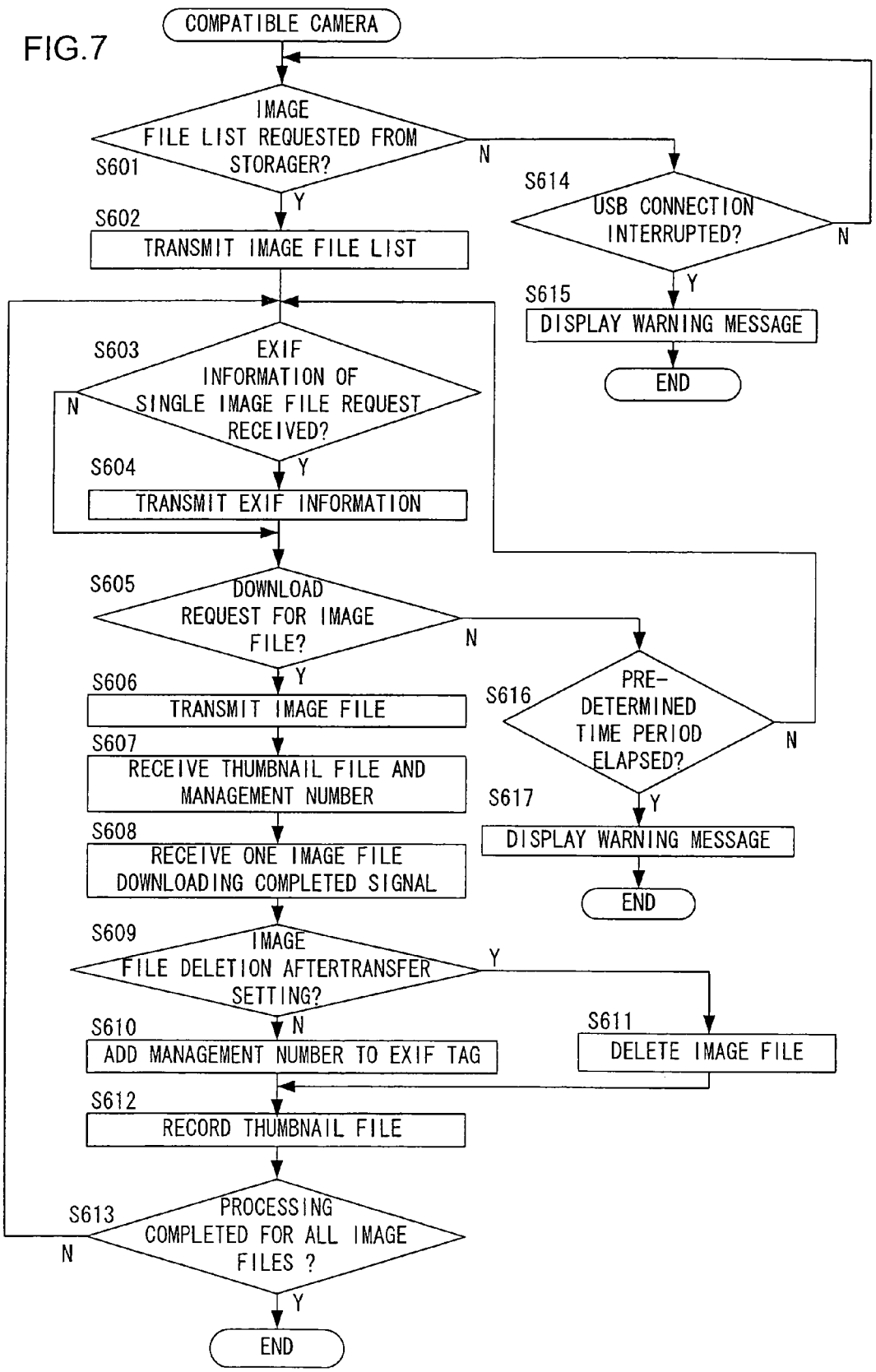
FIG. 7 is a flow chart for explanation of certain processing steps during the transmission of an image file by a compatible camera that is connected to this external storage device.
Figure 8:
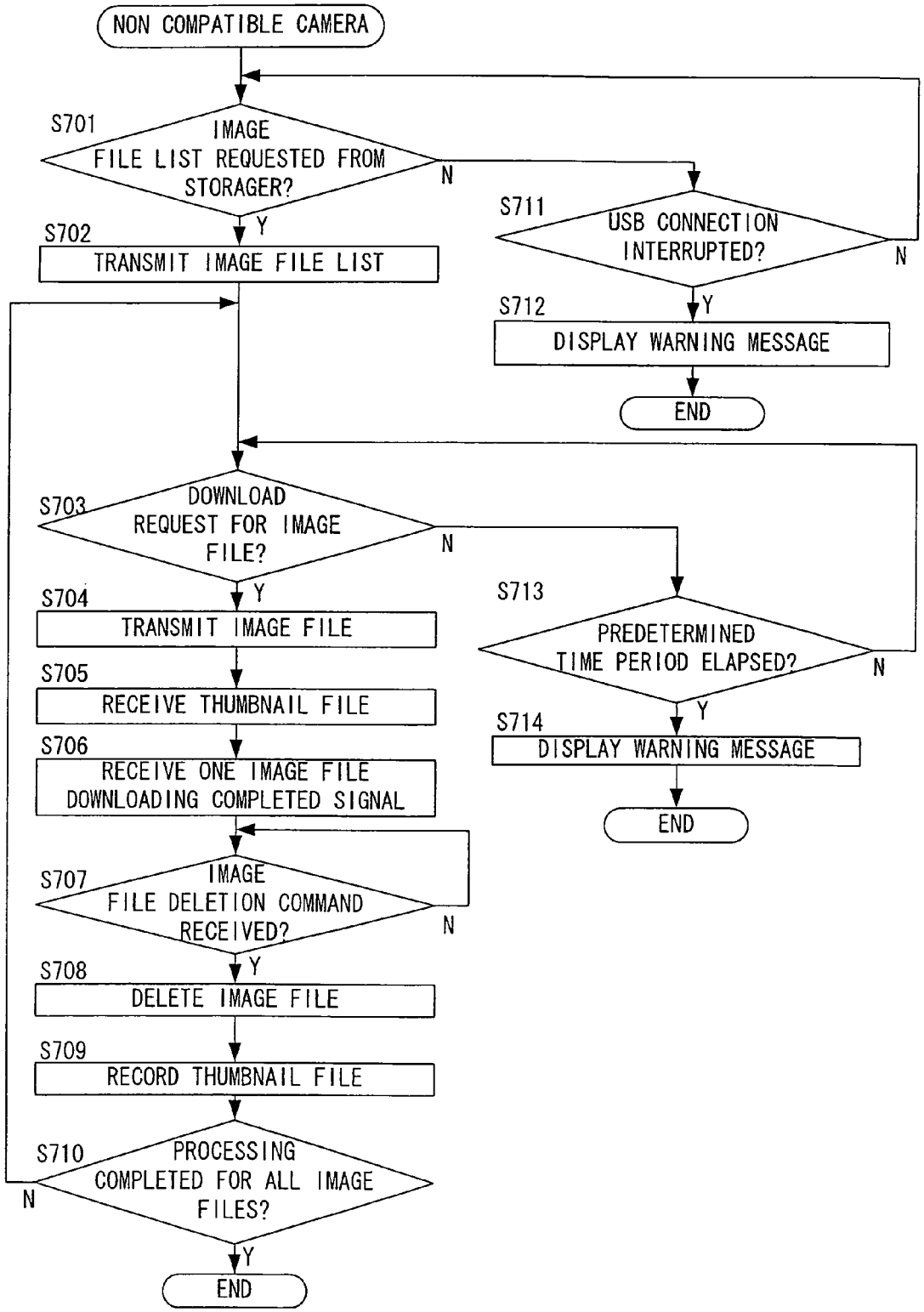
FIG. 8 is a flow chart for explanation of certain processing steps during the transmission of an image file by a non-compatible camera that is connected to this external storage device.

In the following, various processing steps by the electronic camera 100 that is connected to the storager 200 for transferring image files will be explained using the flow charts of FIGS. 7 and 8. The program that performs the processing steps of FIGS. 7 and 8 is stored in a memory within the CPU-C 14 (not shown in the figures), and is started and executed by the CPU-C 14 when a signal indicating that an external device has been connected is input from the external interface 23. It should be understood that FIG. 7 is a flow chart for a storage-compatible camera, while FIG. 8 is a flow chart for a non-storager-compatible camera. The various steps of FIGS. 7 and 8 are executed on the basis of commands by the CPU-C 14.

In a step S601 of FIG. 7, a decision is made as to whether or not a signal requesting the transmission of an image file list has been received from the CPU-S 201 of the storager 200. If an image file list request has been received, an affirmative decision is made in this step S601 and the flow of control proceeds to a step S602. If no signal requesting the transmission of an image file list has been received, a negative decision is made in this step S601 and the flow of control is transferred to a step S614.

In the step S602, the image file list that was requested in the step S601 is transmitted to the CPU-S of the storager 200, and then the flow of control proceeds to a step S603. In this step S603, a decision is made as to whether or not a signal requesting the transmission of the EXIF information in a single image file has been received from the CPU-S 201. If a signal requesting the transmission of EXIF information has been received, an affirmative decision is made in this step S603 and the flow of control proceeds to a step S604. In this step S604, along with transmitting the EXIF information that was requested in the step S603 to the CPU-S 201, a timer not shown in the figures is started, and then the flow of control proceeds to a step S605. If no signal that requests the transmission of EXIF information has been received, a negative decision is made in the step S603, and the step S604 is skipped and the flow of control is transferred to the step S605.

In the step S605, a decision is made as to whether or not a signal requesting the downloading of an image file has been received from the CPU-S 201. If a signal requesting the downloading has been received, an affirmative decision is made in this step S605 and the flow of control proceeds to a step S606. If no signal requesting downloading has been received, a negative decision is made in this step S605 and the flow of control is transferred to a step S616. In the step S606, the image file that was requested in the step S605 is transmitted to the CPU-S 201, and then the flow of control proceeds to a step S607.

In the step S607, the thumbnail image file that corresponds to the image file and the management number that have been transmitted are received from the CPU-S 201. And in a step S608 a signal indicating that the downloading from the CPU-S 201 has been completed is received, and then the flow of control proceeds to a step S609. In this step S609, a decision is made as to whether or not the setting for deletion of image files after transfer is ON. If this setting for deletion of image files is ON, an affirmative decision is made in this step S609 and the flow of control is transferred to a step S611. If this setting for deletion of image files is OFF, a negative decision is made in this step S609 and the flow of control proceeds to a step S610.

In the step S611, the image file corresponding to the thumbnail image file that has been received is deleted from the memory card 30, and then the flow of control proceeds to a step S612. However, in the step S610, the management number that was received in the step S607 is added to the EXIF tag of the image file, and then the flow of control is transferred to the step S612. In this step S612, the thumbnail image file that was received in the step S607 is recorded upon the memory card 30, and then the flow of control proceeds to a step S613. In the step S613, a decision is made as to whether or not the processing of the step S603 through the step S612 has been completed for all of the image files upon the image file list. If the processing has been completed for all of the image files, an affirmative decision is made in this step S613 and this processing sequence terminates. If there is some image files for which the processing have not been completed, a negative decision is made in this step S613 and the flow of control returns to the step S603.

If a negative decision is made in the step S601, the flow of control is transferred to a step S614. In this step S614, a decision is made as to whether or not the connection to the storager 200 has been interrupted, on the basis of the signal from the external interface 23. If the connection to the storager 200 has been interrupted, an affirmative decision is made in this step S614, and a warning message is displayed upon the liquid crystal monitor 6 and this processing sequence terminates. If the connection to the storager 200 is still established, a negative decision is made in this step S614 and the flow of control returns to the step S601.

If a negative decision is reached in the step S605, the flow of control is transferred to a step S616. In this step S616, a decision is made as to whether or not a predetermined time period has elapsed, on the basis of the time period that has been measured by the timer that was started in the step S604. If the predetermined time period has elapsed, an affirmative decision is made in this step S616 and a warning message is displayed upon the liquid crystal monitor 6, and then this processing sequence terminates. If the predetermined time period has not elapsed, a negative decision is made in this step S616 and the flow of control returns to the step S603.

In the following, the processing steps for transferring an image file in the case that the electronic camera 100 is a non-storager-compatible camera will be explained using the flow chart of FIG. 8.

In a step S701, a decision is made as to whether or not a signal requesting the transmission of an image file list has been received from the CPU-S 201 of the storager 200. If an image file list request has been received, an affirmative decision is made in this step S701 and the flow of control proceeds to a step S702. If an image file list has not been requested, a negative decision is made in this step S701 and the flow of control is transferred to a step S711.

In the step S702, along with transmitting the image file list to the CPU-S 201, a timer not shown in the figures is started. Then in a step S703, a decision is made as to whether or not a signal requesting the downloading of an image file has been received from the CPU-S 201. If a signal requesting the downloading has been received, an affirmative decision is made in this step S703 and the flow of control proceeds to a step S704. If no signal requesting the downloading has been received, a negative decision is made in this step S703, and the flow of control is transferred to a step S713. In the step S704, the image file that was requested in the step S703 is transmitted to the CPU-S 201, and then the flow of control proceeds to a step S705.

In the step S705, the thumbnail image file corresponding to the image file that was transmitted in the step S704 is received from the CPU-S 201. In a step S706, a signal that indicates that the downloading has been completed is received from the CPU-S 201. In the next step S707, a decision is made as to whether or not a signal that commands the deletion of the image file has been received from the CPU-S 201. If a signal that commands deletion of the image file has been received, an affirmative decision is made in this step S707 and the flow of control proceeds to a step S708. If no signal that commands the deletion of the image file has been received, a negative decision is made in this step S707 and the system waits until the signal is received.

In the step S708, the image file corresponding to the thumbnail image file that has been received is deleted from the memory card 30, and then the flow of control proceeds to a step S709. In the processing steps from the step S709 (thumbnail image file recording) through the step S714 (display of a warning message), similar processing is performed to which of the processing steps from the step S612 of FIG. 7 (thumbnail image file recording) to the step S617 thereof (display of a warning message).

In the following, the subroutine of the step S4 of FIG. 5 that is called when a storager connection is established will be explained using the flow chart shown in FIG. 9. FIG. 4 will also be referred to.

In a step S401, a decision is made as to whether or not an ON signal is being input from the backup button 213A. If an ON signal is being input from the backup button 213A, an affirmative decision is made in this step S401 and the flow of control proceeds to a step S402. If an ON signal is not being input from the backup button 213A, a negative decision is made in this step S401 and the flow of control is transferred to a step S413.

In the step S402 the storager 200A is set as a host, and then the flow of control proceeds to a step S403. In this step S403 the host LED 214A is illuminated, and then the flow of control proceeds to a step S404. In this step S404, along with a signal being transmitted to the CPU-S 201B of the storager 200B that commands it to be set as a peripheral, also a timer not shown in the figures is started, and then the flow of control proceeds to a step S405.

In the step S405, a decision is made as to whether or not a signal that signifies a peripheral response has been received from the CPU-S 201B of the storager 200B. If a peripheral response signal has been received, an affirmative decision is made in this step S405 and the flow of control proceeds to a step S406. If no peripheral response signal has been received, a negative decision is made in this step S405 and the flow of control is transferred to a step S407.

In the step S407, a decision is made as to whether or not a storager file list that was requested from the CPU-S 201B in the step S406 has been received. If a storager file list has been received, an affirmative decision is made in this step S407 and the flow of control proceeds to a step S408. If no storager file list has been received, a negative decision is made in this step 5407 and the system waits at this step S407 until a storager file list is received.

In the step S408, differential image files are extracted on the basis of the management numbers, as described above, and then a single differential image file is selected from among these differential image files, and the flow of control proceeds to a step S409. In this step S409, a signal requesting the downloading of the differential image file that was selected in the step S408 is transmitted to the CPU-S 201B, and then the flow of control proceeds to a step S410.

In the step S410, the differential image file is downloaded from the CPU-S 201B and is recorded upon the hard disk 202A, and then the flow of control proceeds to a step S411. In this step S411, a decision is made as to whether or not the downloading of all of the differential image files has been completed. If all of the differential image files have been downloaded, an affirmative decision is made in this step S411 and the flow of control proceeds to a step S411a. If there is still some differential image files that have not been downloaded, a negative decision is made in this step S411 and the flow of control returns to the step S408. In the step S411a, a completion notification signal indicating that the downloading of all of the differential image files has been completed is transmitted to the CPU-S 201B, and then the flow of control proceeds to a step S412. In this step S412 the host LED 214A is turned OFF, and then the flow of control leaves this subroutine and returns to the original calling location.

In the step S413 to which the flow of control proceeds if a negative decision has been made in the step S401, a decision is made as to whether or not the connection to the external device has been interrupted, on the basis of the signal from the external interface 213A. If the connection to the external device has been interrupted, an affirmative decision is made in this step S413, and the flow of control leaves this subroutine and returns to the original calling location when the storager was connected. If the connection to the external device is still established, a negative decision is made in this step S413 and the flow of control returns to the step S401.

In the step S414 to which the flow of control is transferred if a negative decision is made in the step S405, a decision is made as to whether or not a predetermined time period has elapsed, on the basis of the time period that has been measured by the timer that was started in the step S404. If the predetermined time period has elapsed, an affirmative decision is made in this step S414 and the flow of control proceeds to a step S415. If the predetermined time period has not elapsed, a negative decision is made in this step S414 and the flow of control returns to the step S405. In the step S415 the host LED 214A is blinked for a predetermined time period, the flow of control then proceeds to a step S416 in which the host LED 214A is turned OFF, and then the flow of control leaves this subroutine and returns to the original calling location when the storager was connected.

Figure 10:
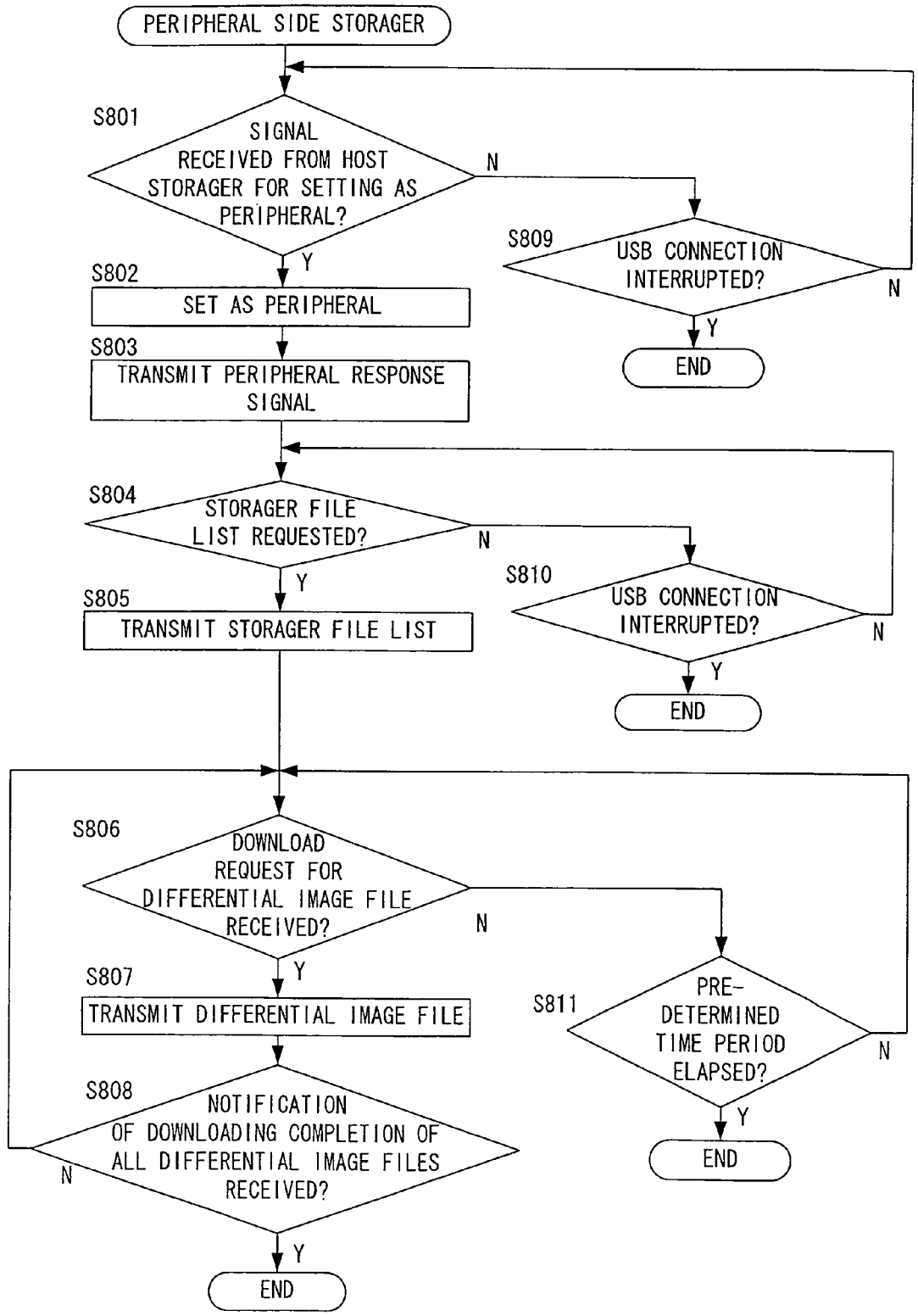
FIG. 10 is a flow chart for explanation of certain processing steps during an image file transmission operation, when two external storage devices have been connected together.

In the following various processing steps for the transfer of an image file by the storager 200B that is connected to the storager 200A will be explained using the flow chart shown in FIG. 10. A program that performs the various processing steps of FIG. 10 is stored in a memory (not shown in the figures) within the CPU-S 201B, and is started and is executed by the CPU-S 201B when a signal indicating that an external device has been connected to the external interface 212B is input. Each of the steps in FIG. 10 is executed on the basis of a command by the CPU-S 201B.

In a step S801, a decision is made as to whether or not a signal that commands setting as a peripheral has been received from the CPU-S 201A of the storager 200A. If a command for setting as a peripheral has been received, an affirmative decision is made in the step S801, and the flow of control proceeds to a step S802. If no command has been received, a negative decision is made in this step S801 and the flow of control is transferred to a step S809. In the step S802 the storager 200B is set as a peripheral, and then the flow of control proceeds to a step S803.

In the step S803 a peripheral response signal is transmitted to the CPU-S 201A of the storager 200A, and then the flow of control proceeds to the step S804. In this step S804, a decision is made as to whether or not a signal requesting the transmission of a storager file list has been received from the CPU-S 201A of the storager 200A. If a signal requesting the transmission of a storager file list has been received, an affirmative decision is made in this step S804 and the flow of control proceeds to a step S805. If no signal requesting the transmission of a storager file list has been received, a negative decision is made in this step S804 and the flow of control is transferred to a step S810.

In the step S805, the storager file list that was requested in the step S804 is transmitted to the CPU-S 201A of the storager 200A. Moreover a timer not shown in the figures is started, and then the flow of control proceeds to a step S806. In this step S806, a decision is made as to whether or not a signal requesting the downloading of a differential image file has been received from the CPU-S 201A. If a signal requesting a download has been received, an affirmative decision is made in this step S806 and the flow of control proceeds to a step S807. If no signal requesting a download has been received, a negative decision is made in this step S806 and the flow of control is transferred to a step S811.

In the step S807, the differential image file that was requested in the step S806 is transmitted to the CPU-S 201A, and then the flow of control proceeds to a step S808. In this step S808, a decision is made as to whether or not a completion notification signal indicating that the downloading of all of the differential image files has been completed has been received from the CPU-S 201A of the storager 200A. If a completion notification signal has been received, an affirmative decision is made in the step S808 and this processing sequence terminates. If no completion notification signal has been received, a negative decision is made in the step S808, and the flow of control returns to the step S806.

If a negative decision has been made in the step S801, the flow of control is transferred to a step S809. In this step S809, a decision is made as to whether or not the connection to the storager 200A has been interrupted, on the basis of the signal from the external interface 212B. If the connection to the storager 200A has been interrupted, an affirmative decision is made in this step S809, and this processing sequence terminates. If the connection to the storager 200A is still established, a negative decision is made in this step S809 and the flow of control returns to the step S801.

If a negative decision is made in the step S804, the flow of control is transferred to a step S810. In this step S810, similar processing is performed to that of the step S809. If a negative decision is made in the step S806, the flow of control is transferred to a step S811. In this step S811, a decision is made as to whether or not a predetermined time period has elapsed, on the basis of the time period that has been measured by the timer that was started in the step S805. If the predetermined time period has elapsed, an affirmative decision is made in this step S811 and this processing sequence terminates. If the predetermined time period has not elapsed, a negative decision is made in this step S811 and the flow of control returns to the step S806.

According to the external storage device according to this embodiment as explained above, the following beneficial operational effects are obtained.

(1) It is arranged that if the electronic camera 100 that has been connected to the storager 200 is a compatible camera, the storager 200 selects an image file to download, in other words an image file to receive, on the basis of the management numbers that are added to the EXIF information of the image files in the hard disk 202 and the memory card 30 of the electronic camera 100. These management numbers are numbers that are based upon the serial number of the electronic camera 100, the serial number of the storager 200 to which downloading has been performed, and a consecutive number that shows the sequence in which the image was recorded. In other words, since the management number contains information that specifies the device that was the source of the downloading and information that specifies the device that was the destination of the downloading, it is possible for the storager 200 to select the image files to be downloaded without either finding too many or too few thereof.

In the case of prior art storagers, there are some that download image files from an electronic camera by using a differential transfer method. A storager that employs a differential transfer method downloads an image file from the electronic camera, if at least one of the file name and the file creation date and time are different between the image files within the storager and the image files within the electronic camera. With this differential transfer method, even if the image file that is recorded in the electronic camera and the image file that is recorded in the storager are different, the storager does not download this image file that is different, if by chance the file name and the file creation date and time agree with one another. However, it is arranged for the storager 200 according to the present invention to select the image files to be downloaded on the basis of their management numbers. As a result, even if by chance the file names and the file creation dates and times of two different image files should agree with one another, still a malfunction of the type described above does not occur, and it is possible to select the different image files.

(2) If the electronic camera 100 is a camera that is compatible with the storager 200 after the image files have been transferred from the electronic camera 100 to the storager 200, it is possible to make a setting for these image files to be deleted. If it is set for the image files to be deleted after transfer, in other words if it is specified that the image files that have been transferred should become image files that are scheduled for deletion, the electronic camera 100 records on the memory card 30 thumbnail image files, to which have been appended management numbers transmitted from the storager 200. Moreover, the electronic camera 100 deletes the main image files after having received a signal indicating that the downloading thereof has been completed from the storager 200. Accordingly, it is possible to ensure the recording area upon the memory card 30, since the thumbnail image files whose capacities are smaller than those of the image files are recorded upon the memory card 30.

(3) If the electronic camera 100 that has been connected to the storager 200 is a non-storager-compatible electronic camera, it is arranged for the storager 200 to select the image files to be downloaded on the basis of the file names of the image files upon the hard disk 202 and within the memory card 30 of the electronic camera 100. These file names are set on the basis of the management numbers. In other words, the file names include the serial number of the electronic camera 100, the serial number of the storager 200 that has performed downloading, and a consecutive number that shows the order of recording in the storager 200. Accordingly, since the storager 200 selects those image files not having file names that include the management numbers as the image files to be downloaded, it is able to select the image files to be downloaded without either selecting too many or too few thereof.

(4) If the electronic camera 100 that has been connected to the storager 200 is a non-storager-compatible camera, thumbnail image files are created by processing the image files that have been downloaded from the storager 200. And it is arranged for the names of these files to be changed on the basis of the management numbers, and for them to be transmitted to the electronic camera 100. Moreover, for the image files that have been transmitted to the storager 200, it is arranged for these to be deleted from the memory card 30 of the electronic camera 100, according to a command from the CPU-S 201 of the storager 200. Accordingly it is possible to ensure a sufficient recording region upon the memory card 30, since only the thumbnail image files whose capacities are small are recorded upon the memory card 30.

(5) If two storagers 200 are connected together, according to, for example, the USB OTG standard, one of them is set as a host and the other as a peripheral. It is arranged for the storager 200 that is the host to obtain the differential between a list of the image files that are held by the peripheral storager 200, and a list of the storager files that are held by the host storager, and to download those differential image files. Accordingly, it is possible to select the image files to be downloaded without either selecting too many or too few thereof.

(6) When an external device is connected to the storager 200A and the transmission and reception of data is started, the CPU-S 201A identifies whether the external device is another storager 200B or is an electronic camera 100, by using a device type code or an identifier or the like. Moreover, when the connection of an electronic camera 100 is identified, the CPU-S 201A distinguishes whether this electronic camera 100 is a storager-compatible camera or a non-storager-compatible camera. And it is arranged for the CPU-S 201A to select the image files to be transferred by different processing, according to the external device that is connected. Accordingly it is possible to select and receive the image files to be downloaded without any problem occurring therewith, irrespective of the type of external device that has been connected.

The embodiment explained above may be varied in the following way.

If the electronic camera 100 that has been connected to the storager 200 is a non-storager-compatible camera, it is arranged for the storager 200 to transmit a thumbnail image file to the electronic camera 100, and for a signal that commands the deletion of the image file upon the memory card 30 of the electronic camera 100 to be transmitted. However, instead of transmitting the thumbnail image file, it would also be acceptable to arrange for an image file that has not yet been processed, and that has a file name that has been changed to the management number, to be transmitted.

While, in the above description, various embodiments and variant embodiments have been explained, the present invention is not to be considered as being limited to the details thereof. Other variations are also to be considered as being included within the range of the present invention.

The content of the disclosure of the following application, upon which priority is claimed, is hereby incorporated herein by reference:
Japanese Patent Application 213,407 of 2006 (applied on Aug. 4, 2006).

The invention claimed is:

1. An external storage device, comprising:
a decision unit that decides whether a camera that is connected to the external storage device is a compatible camera or a non-compatible camera, the compatible camera storing a first image file including at least a first file name, a first image data and first information and the non-compatible camera storing a second image file including at least a second file name, a second image data and second information;
a storage unit that stores the first image file received from the compatible camera or the second image file received from the non-compatible camera as a third image file and management information regarding the external storage device and the camera connected thereto, the third image file including at least a third file name, a third image data and third information;
an identification unit that, if the decision unit decides that the camera is the compatible camera, compares the first information included in the first image file with the management information and identifies the first image file to be received from the compatible camera if the first information does not include the management information, and, if the decision unit decides that the camera is the non-compatible camera, compares the second file name included in the second image file with the management information and identifies the second image file to be received from the non-compatible camera if the second file name does not include the management information;
a reception unit that receives the first image file identified by the identification unit if the camera is the compatible camera, and receives the second image file identified by the identification unit if the camera is the non-compatible camera;
a change unit that creates the third information by adding the management information to the first information included in the first image file received by the reception unit and creates the third image file by changing the first information to the created third information if the camera is the compatible camera, and creates the third file name by adding the management information to the second file name included in the second image file received by the reception unit and creates the third image file by changing the second file name to the created third file name if the camera is the non-compatible camera; and
a transmission unit that transmits the management information and the third image file created from the received first image file by the change unit to the compatible camera, and transmits the created third image file with the created third file name to the non-compatible camera, wherein
the storage unit stores the third image file created by the change unit.

2. The external storage device according to claim 1, further comprising:
a command unit that commands writing of the management information transmitted by the transmission unit to the compatible camera in a management information recording field regarding the first image file stored in the compatible camera.

3. A camera that is connected to an external storage device according to claim 2, further comprising:
a deletion setting unit that specifies an image file scheduled for deletion among first image files, before the identified first image file is transmitted to the external storage device, the image file scheduled for deletion being deleted after the transmission of the first image file to the external storage device; and
a deletion unit that deletes the image file scheduled for deletion from within the compatible camera, after the identified first image file has been transmitted to the external storage device.

4. The camera according to claim 3, wherein:
the deletion unit deletes the image file scheduled for deletion, after a signal indicating that the external storage device has completed reception of the first image file has been inputted from the external storage device.

5. The camera according to claim 3, further comprising:
a write unit that writes the transmitted management information as the first information in the management information recording field regarding the first image file stored in the compatible camera, when the command is inputted from the command unit.

6. The external storage device according to claim 1, wherein:
the second file name specifies a device to which the second image file has been transmitted, and
the third file name specifies that the device to which the second image file has been transmitted is the external storage device.

7. The external storage device according to claim 6, wherein:
the identification unit identifies the second image file to be received, if the device specified by the second file name is other than the external storage device specified by the third file name.

8. The external storage device according to claim 1, further comprising:
a deletion command unit that commands the non-compatible camera to delete the second image file within the non-compatible camera, after the third image file has been transmitted by the transmission unit.

9. An external storage device that stores an image file transferred from a camera upon a storing device, comprising:
a device identification unit that identifies whether an external device that has been connected is a camera, or is another external storage device, the camera storing a plurality of image files;
a decision unit that decides whether the camera that has been connected is capable of transferring the image file by first transfer processing or second transfer processing, if the device identification unit identifies that the external device is the camera;
a specification unit that specifies the image file that does not include management information from among the plurality of image files stored in the camera if the decision unit decides that the camera is capable of transferring the image file by the first transfer processing, and specifies the image file of which file name does not include the management information from among the plurality of image files if the decision unit decides that the camera is capable of transferring the image file by the second transfer processing; and a transfer execution unit that receives the image file specified by the specification unit from the camera.

10. The external storage device according to claim 9, wherein:

the transfer execution unit receives an image file that is differential, on the basis of a list regarding the image file read in from the other external storage device and on the basis of a list regarding the image file stored in the storing device.

* * * * *